(12) United States Patent
Daffin

(10) Patent No.: US 7,677,604 B2
(45) Date of Patent: Mar. 16, 2010

(54) ADJUSTABLE OFFSET BUSHING TYPE COUPLING

(76) Inventor: Charles E. Daffin, 5018 Bradfordville Rd., Tallahassee, FL (US) 32309

( * ) Notice: Subject to any disclaimer, the term of this patent is extended or adjusted under 35 U.S.C. 154(b) by 0 days.

(21) Appl. No.: 12/009,070

(22) Filed: Jan. 16, 2008

(65) Prior Publication Data

US 2009/0179419 A1    Jul. 16, 2009

(51) Int. Cl.
F16L 55/00    (2006.01)
(52) U.S. Cl. ........... 285/148.27; 285/56; 285/148.4; 285/190; 285/278
(58) Field of Classification Search ........... 285/56–57, 285/148.27, 148.4, 189–190, 272, 278, 399
See application file for complete search history.

(56) References Cited

U.S. PATENT DOCUMENTS

| 692,375 | A | * | 2/1902 | Snider ............... 239/392 |
| 1,304,979 | A | * | 5/1919 | Hirshstein ............ 285/148.23 |
| 1,793,681 | A | * | 2/1931 | Crowell ............... 285/58 |
| 1,968,391 | A | * | 7/1934 | Hamilton ............. 239/394 |
| 2,295,416 | A | * | 9/1942 | Madison ............. 4/252.4 |
| 2,899,690 | A | | 8/1959 | Clifford |
| 3,015,501 | A | | 1/1962 | Minella |
| 3,140,104 | A | | 7/1964 | Cosper |
| 3,704,034 | A | * | 11/1972 | Shire et al. ............ 285/47 |
| 3,967,836 | A | | 7/1976 | Izzi, Sr. |
| 4,008,734 | A | * | 2/1977 | Shimono et al. ........ 137/314 |
| 4,014,053 | A | | 3/1977 | Jones |
| 6,050,034 | A | * | 4/2000 | Krinner ............... 52/155 |

* cited by examiner

Primary Examiner—Aaron M Dunwoody
Assistant Examiner—Fannie Kee
(74) Attorney, Agent, or Firm—J. Wiley Horton

(57) ABSTRACT

A nested bushing coupling for attaching a plumbing component to a conduit. The assembly includes at least one or more nested bushings having off-centered openings which may be situated at various orientations within a receiver.

4 Claims, 9 Drawing Sheets

ADJUSTABLE OFFSET BUSHING TYPE COUPLING

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention generally relates to the field of plumbing. More particularly, the present invention comprises an adjustable coupling for attaching a plumbing component to a conduit.

2. Description of the Related Art

When constructing a building with a concrete slab foundation, plumbers coordinate with other contractors to install plumbing lines and fixtures. Generally, plumbers place plumbing lines just prior to the pouring of the concrete slab. It is not uncommon for plumbing lines to shift slightly when the concrete is poured, however. Once the concrete has cured—and often after tile work has been laid—the plumber returns to attach the various plumbing fixtures to the lines.

Various building codes define where certain plumbing fixtures—such as toilets—must be placed. Turning to FIG. 1, toilet 10 is installed in a room near back wall 16 and side wall 14. As is known to those skilled in the art, toilet 10 is connected to a drain line via closet flange 12. Because toilet 10 attaches directly to closet flange 12, the location of toilet 10 relative to back wall 16 and side wall 14 is determined by the location of closet flange 12 and the drain line. Closet flange 12 is attached directly to the drain pipe, so the location of closet flange 12 is non-adjustable.

Some building codes prescribe a distance D that the center of toilet must be from side wall 14. Because some inspectors require precise conformity to the prescribed distance (in some cases within ¼ inch), it is important for closet flange 12 to be positioned at the correct location relative to side wall 14. Because the drain pipe and closet flange 12 may shift when the concrete is poured, plumbers may have to break the concrete slab around the drain pipe with a jackhammer so that the drain pipe and closet flange may be shifted to the desired location. In many cases, this requires the drain pipe to be cut and "elbow" joints to be added to center closet flange 12 at the desired location.

The shifting of plumbing lines can also create a misalignment for plumbing lines which are to be placed within walls. Turning to FIG. 2, in-concrete pipe 24 shifted during the concrete pour such that part of the opening of in-concrete pipe 24 extends outside of the footprint of wall 18. In-wall pipe 26 is designed to be placed in wall 18 between first wall boundary 22 and second wall boundary 20. This situation requires the concrete to be broken around in-concrete pipe 24 so that in-concrete pipe 24 may be shifted into alignment with the location of in-wall pipe 26. Once again, this can require the pipe to be cut and elbow joints added to center the pipe between first wall boundary 22 and second wall boundary 20.

As such it would be desirable to provide a plumbing solution which allows for plumbing fixtures to be coupled to in-ground drain lines and placed at the desired location without having to break-up portions of the concrete foundation.

BRIEF SUMMARY OF THE INVENTION

The present invention is a nested bushing coupling for attaching a plumbing component to a conduit. The assembly includes at least one nested bushing having an off-centered opening which may be situated at various orientations within a receiver. In the preferred embodiment, two bushings are used to provide greater adjustment potential. Each bushing is situated within a cylindrical passage and may be rotated within the cylindrical passage to move the location of the off-centered opening of the bushing.

REFERENCE NUMERALS IN THE DRAWINGS

| 10 | toilet | 12 | closet flange |
|---|---|---|---|
| 14 | side wall | 16 | back wall |
| 18 | wall | 20 | inside wall surface |
| 22 | outside wall surface | 24 | in-concrete pipe |
| 26 | in-wall pipe | 28 | conduit |
| 30 | increaser | 32 | opening |
| 34 | offset bushing | 36 | first passage |
| 38 | offset bushing | 40 | second passage |
| 42 | closet flange | 44 | third passage |
| 46 | lip | | |
| 50 | center | 52 | placement region |
| 54 | pipe | 56 | dryer vent |
| 58 | inlet | 60 | concrete |
| 62 | surface | 64 | descending tube |

DETAILED DESCRIPTION OF THE INVENTION

Figure 3:
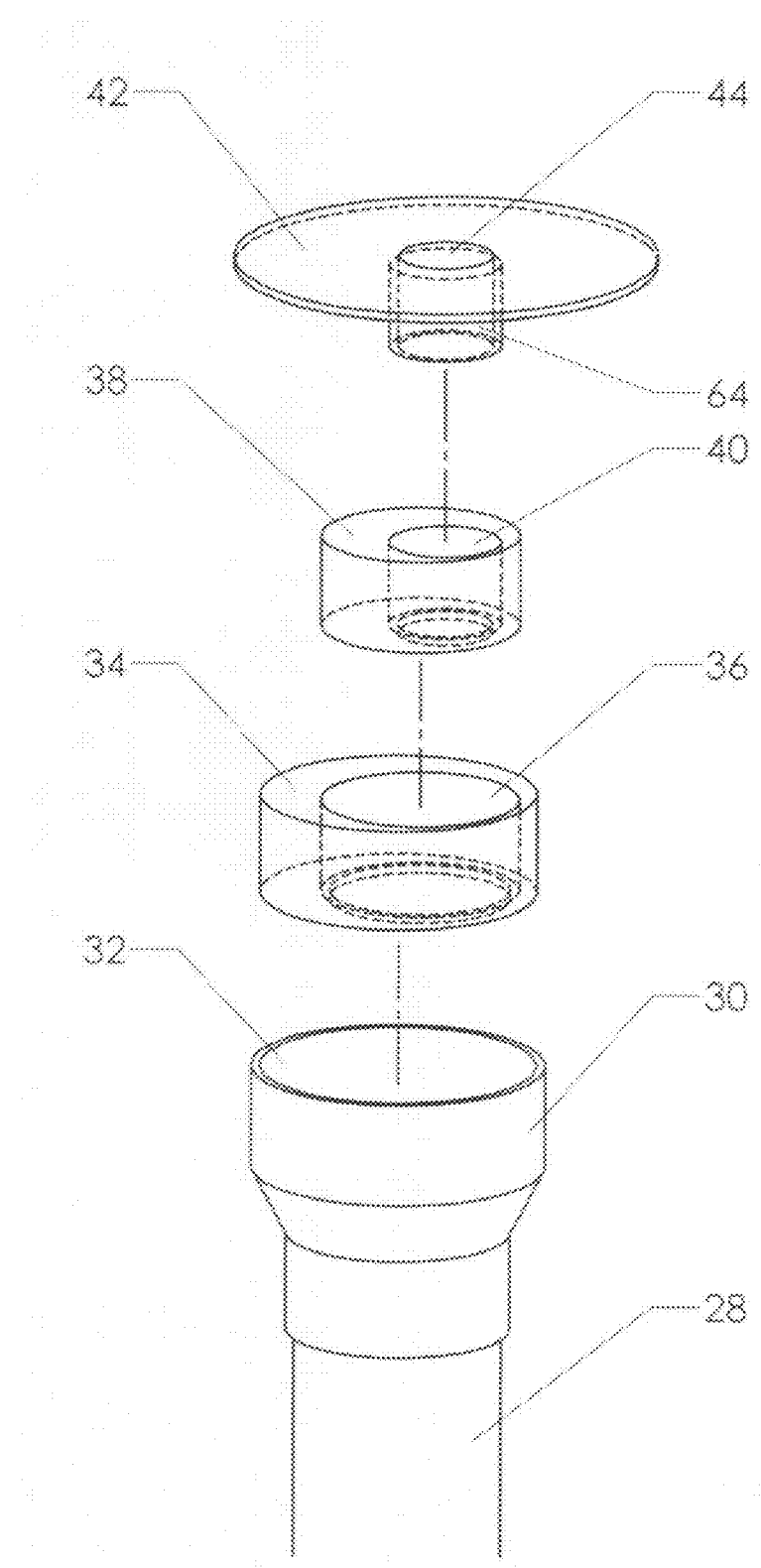
FIG. 3 is an exploded perspective view, illustrating the present invention.

The present invention, an adjustable coupling for attaching a plumbing component to a conduit, is illustrated in FIG. 3. Conduit 28 is a conduit, such as one used to transfer the contents of a toilet basin to a sewer or a septic tank. Conduit 28 may be made of various materials, but most commonly conduit 28 is made of PVC. Increaser 30 is attached to the end of conduit 28 prior to pouring the concrete foundation. Increaser 30 has opening 32 which receives one or more "nested" bushings (offset bushings 34 and 38) and closet flange 42. Closet flange 42 is a simplified depiction of a closet flange. A closet flange typically has slots and holes for receiving bolts which attach the toilet to the closet flange. Opening 32 of increaser 30 is initially sealed with a knockout covering plate or some other seal to prevent concrete from spilling into conduit 28.

Once the concrete is poured, the knockout covering plate is removed from opening 32. Offset bushing 34 fits snugly into and is rotatably situated within opening 32. Offset bushing 38 fits snugly into and is rotatably situated within first passage 36 of offset bushing 34. Descending tube 64 of closet flange 42 fits snugly into and is rotatably situated within second passage 40. Openings 32, 36, 38, 40, and 44 are fluidly connected such that when the contents of the toilet are drained into third passage 44 the contents will pass through the assembly into conduit 28.

Figure 4:
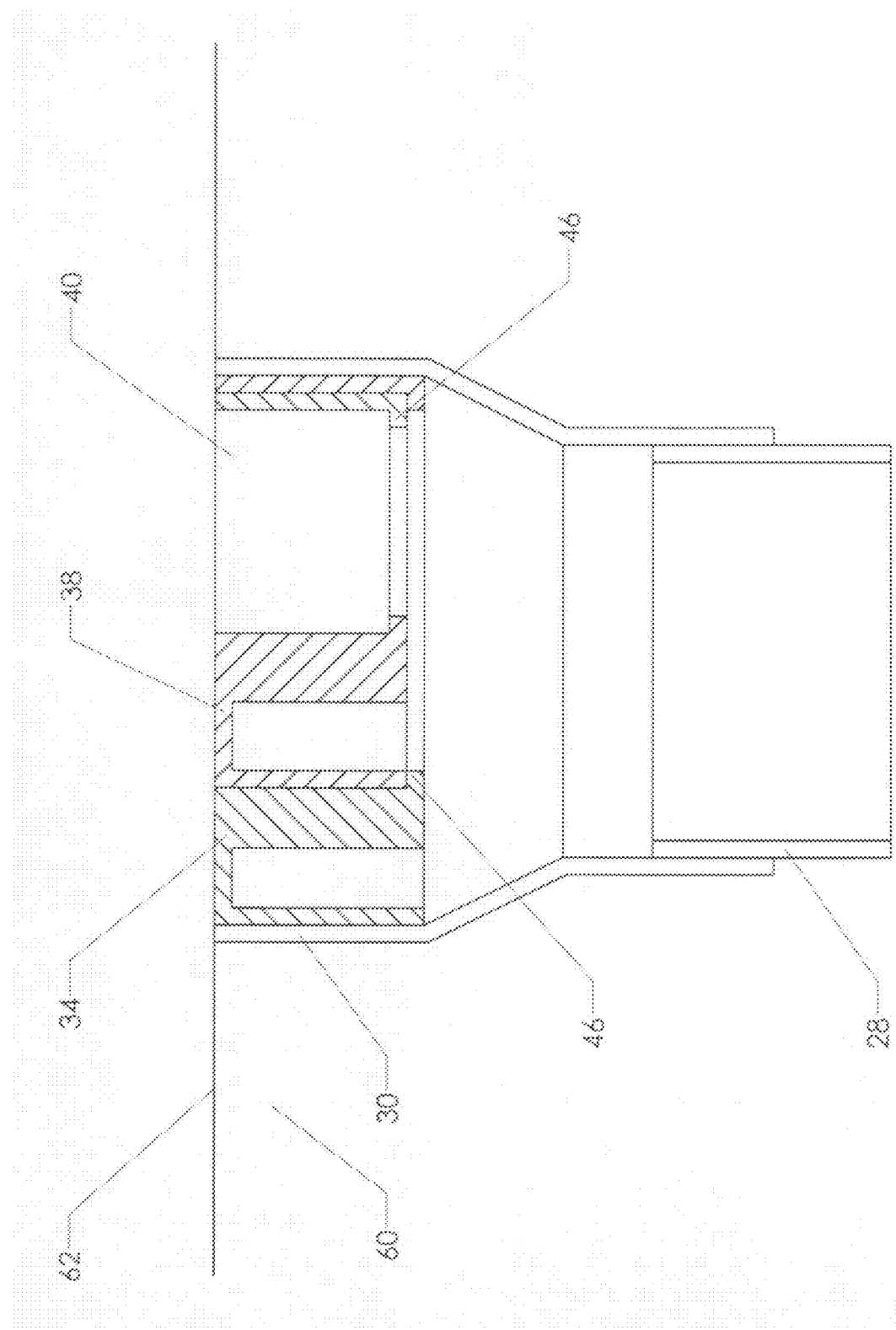
FIG. 4 is a section view, illustrating the present invention.

Turning to FIG. 4, the reader will note that when concrete 60 is poured, increaser 30 and conduit 28 are submerged in the concrete. Surface 62 of concrete 60 is substantially level with the top of increaser 30 and the tops of offset bushing 34 and offset bushing 38, which are placed in increaser 30 after the concrete is poured and the knockout covering plate is removed from opening 32. Offset bushing 34 is rotatably nested in increaser 30 and rests on the narrowing throat of increaser 30. Offset bushing 38 is rotatably nested within the opening of offset bushing 34 and rests on lip 46.

Figure 5:
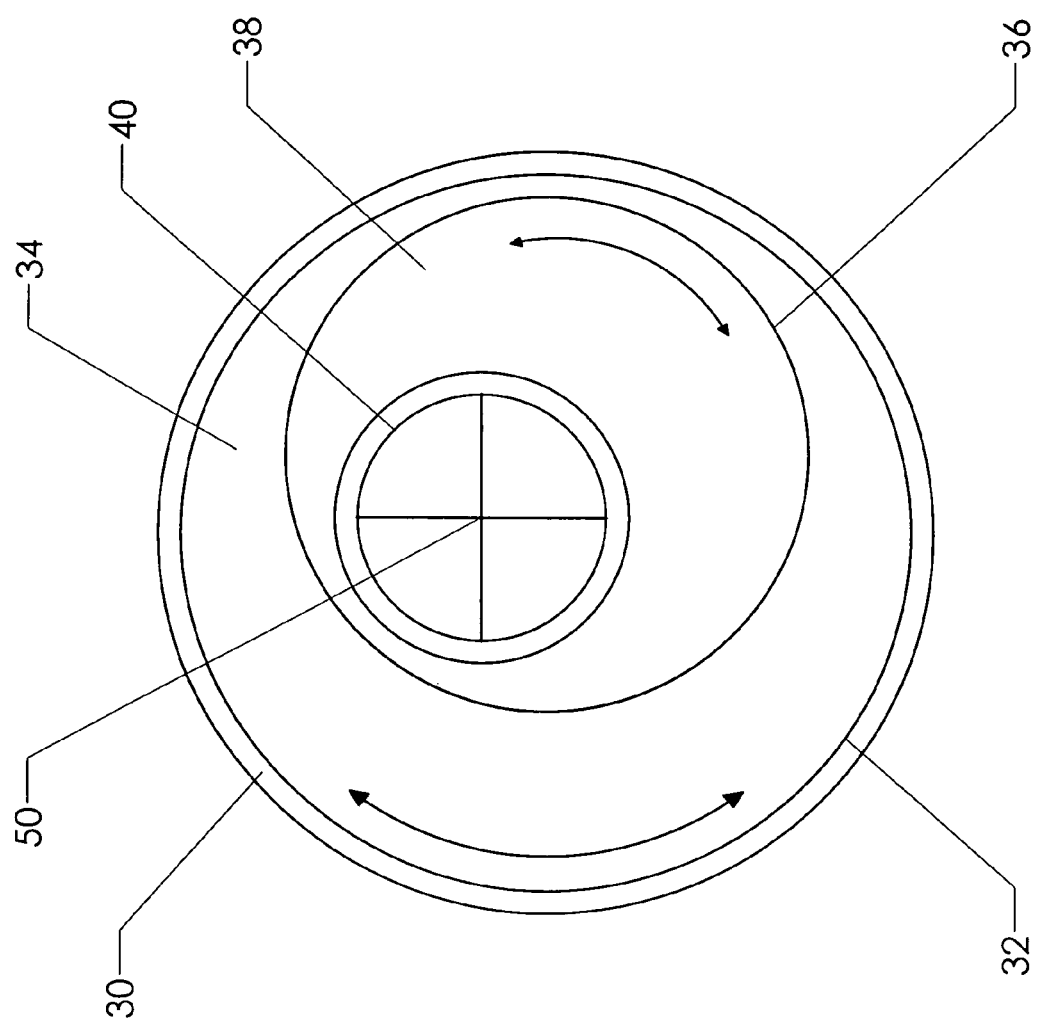
FIG. 5 is a plan view, showing the present invention.

As shown in FIG. 5, offset bushing 34 may be rotated within opening 32 of increaser 30. Likewise, offset bushing 38 may be rotated within first passage 36 of offset bushing 34. The rotation of either offset bushing 34 or offset bushing 38 will change the location of center 50 of second passage 40. This feature allows the user to place center 50 at various locations after the concrete foundation has been poured and cured.

Figure 6:
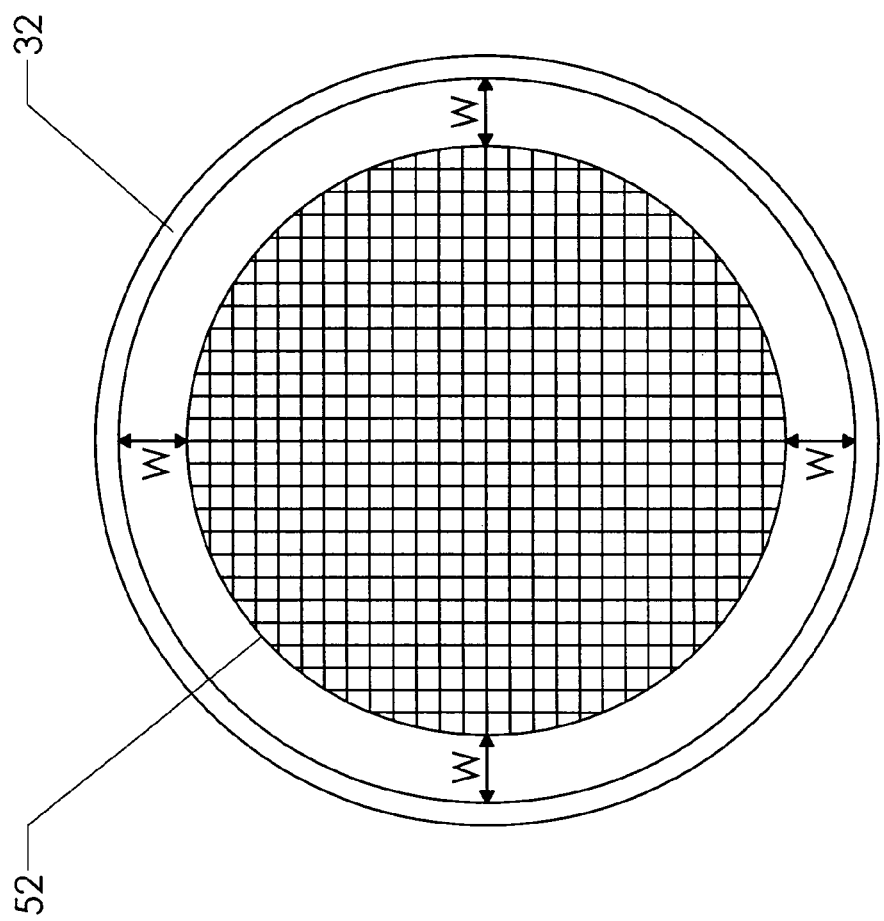
FIG. 6 is a plan view, illustrating the range of placement positions allowed by the present invention.

FIG. 6 shows the general region in which descending tube 64 of closet flange may be placed by rotating offset bushings 34 and 38. This region is illustrated as placement region 52 in FIG. 6. Width W defines the difference between the location of the inside surface of increaser 30 and placement region. Width W is a function of the location of first passage 36 and second passage 40 relative to the outside facing wall of offset busing 34 and offset bushing 38, respectively. The closer first passage 36 and second passage 40 are placed to the outside facing walls (i.e. the greater the offset from center), the smaller width W will be. Openings 36 and 40 are preferably located on the respective bushings such that placement region 52 is maximized. Openings 36 and 40 are further preferably located such that it is possible to align center 50 with the actual center of increaser 30.

The reader will now appreciate how the present invention may be employed by a plumber as part of the construction process. First, the plumber places pipes within the graded ground mold consistent with the building plans. Second, concrete is poured into the ground mold. Once the concrete cures, the plumber removes the knockout covering plate from opening 32 of increaser 30. The offset bushings are then placed in opening 32 and rotated until second passage 40 is centered at the desired location. PVC cement is then applied to the cylindrical surfaces of the bushings and the coupling is allowed to set.

Figure 1:
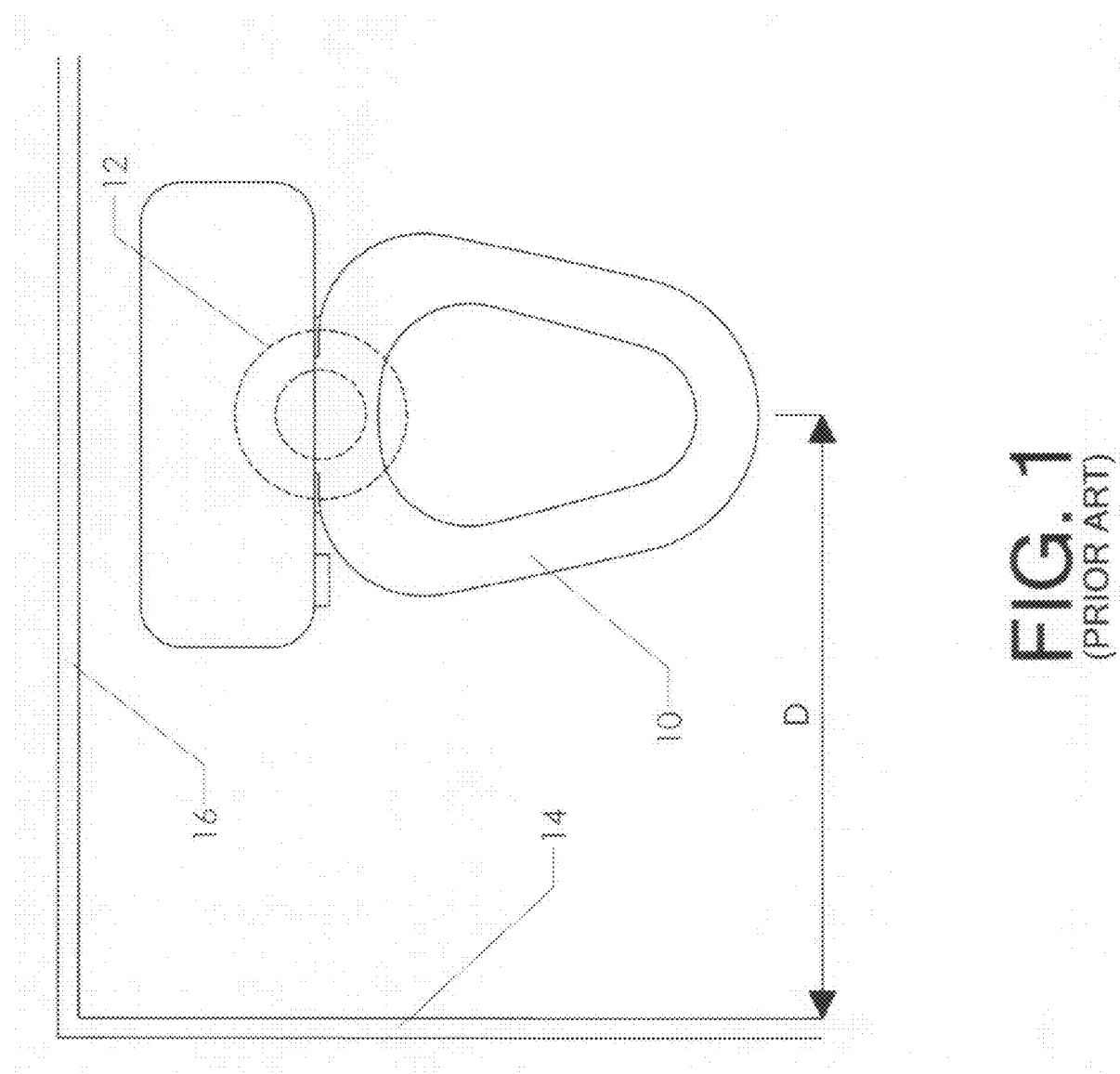
FIG. 1 is a plan view, illustrating the placement of a toilet next to a side wall.
Figure 2:
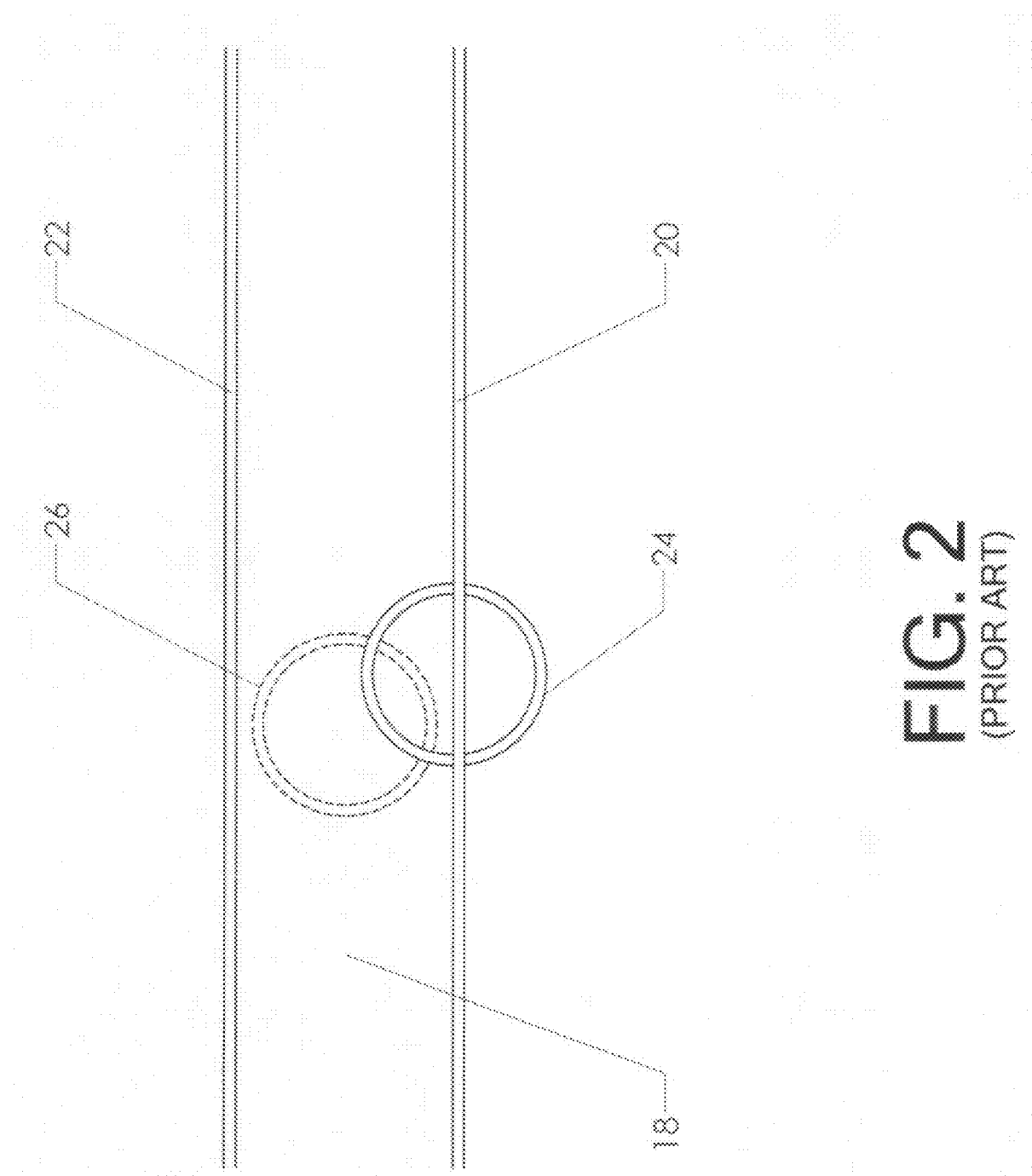
FIG. 2 is a plan view, illustrating the misalignment of a conduit and an in-wall pipe.
Figure 7:
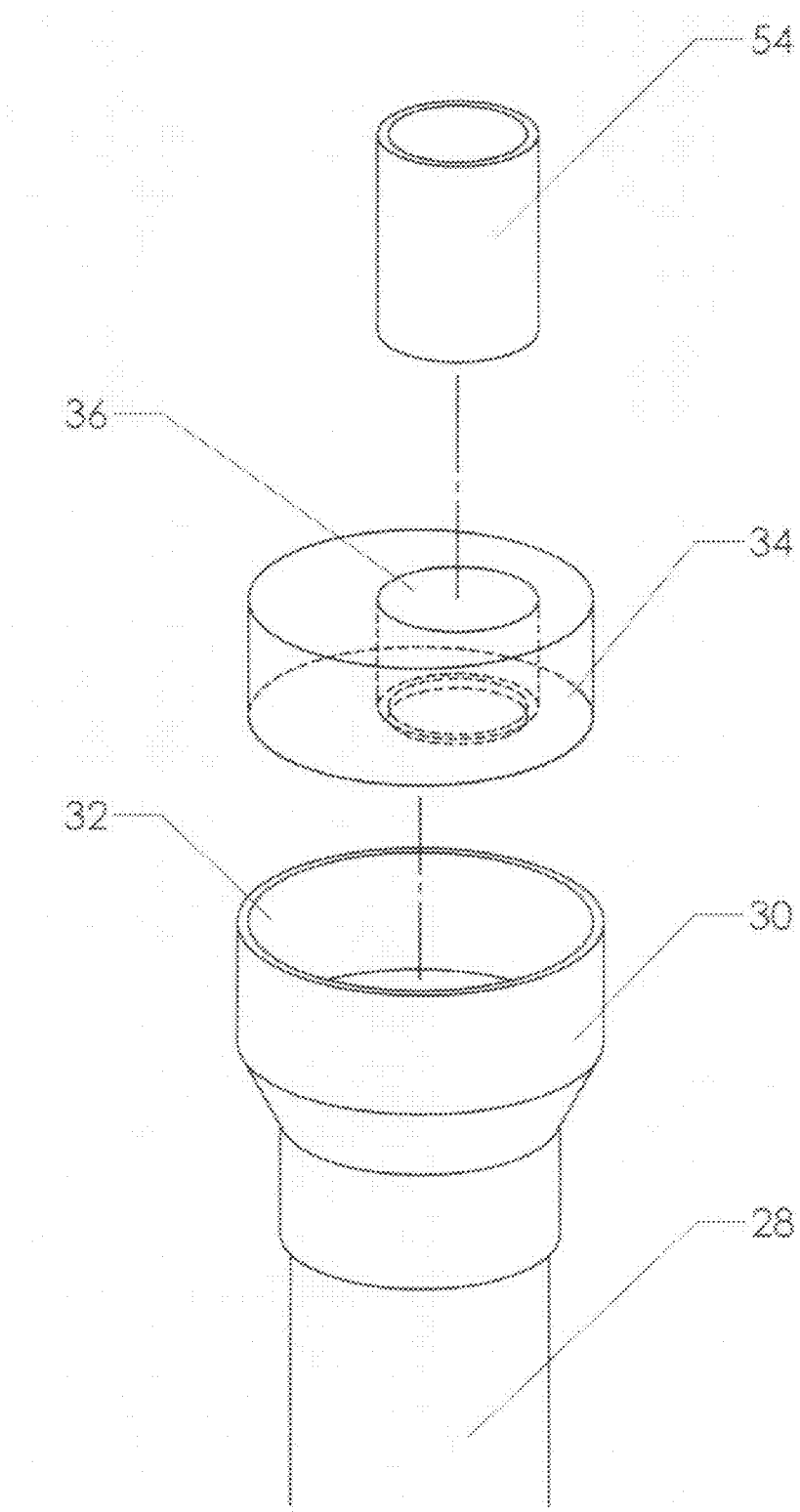
FIG. 7 is an exploded perspective view, showing the present invention.

The invention can also be used to address misalignment of plumbing conduits intended to reside within a wall. FIG. 7 shows a single nested bushing assembly which may be used to align an in-wall pipe to a conduit. In this example, offset bushing 34 is used to fluidly connect pipe 54 (a pipe to extend vertically within a wall such as the example shown in FIG. 2) to conduit 28 (an in-concrete plumbing line). As shown with the example in FIG. 4, increaser 30 and conduit 28 are submerged in concrete such that the surface of the concrete is substantially level with the top of increaser 30 and opening 32. Offset bushing 34 is rotatably nested in opening 32. First passage 36 of offset bushing 34 is offset from the center of offset bushing 34 so that the location of first passage 36 may be adjusted to a desired location.

Figure 9:
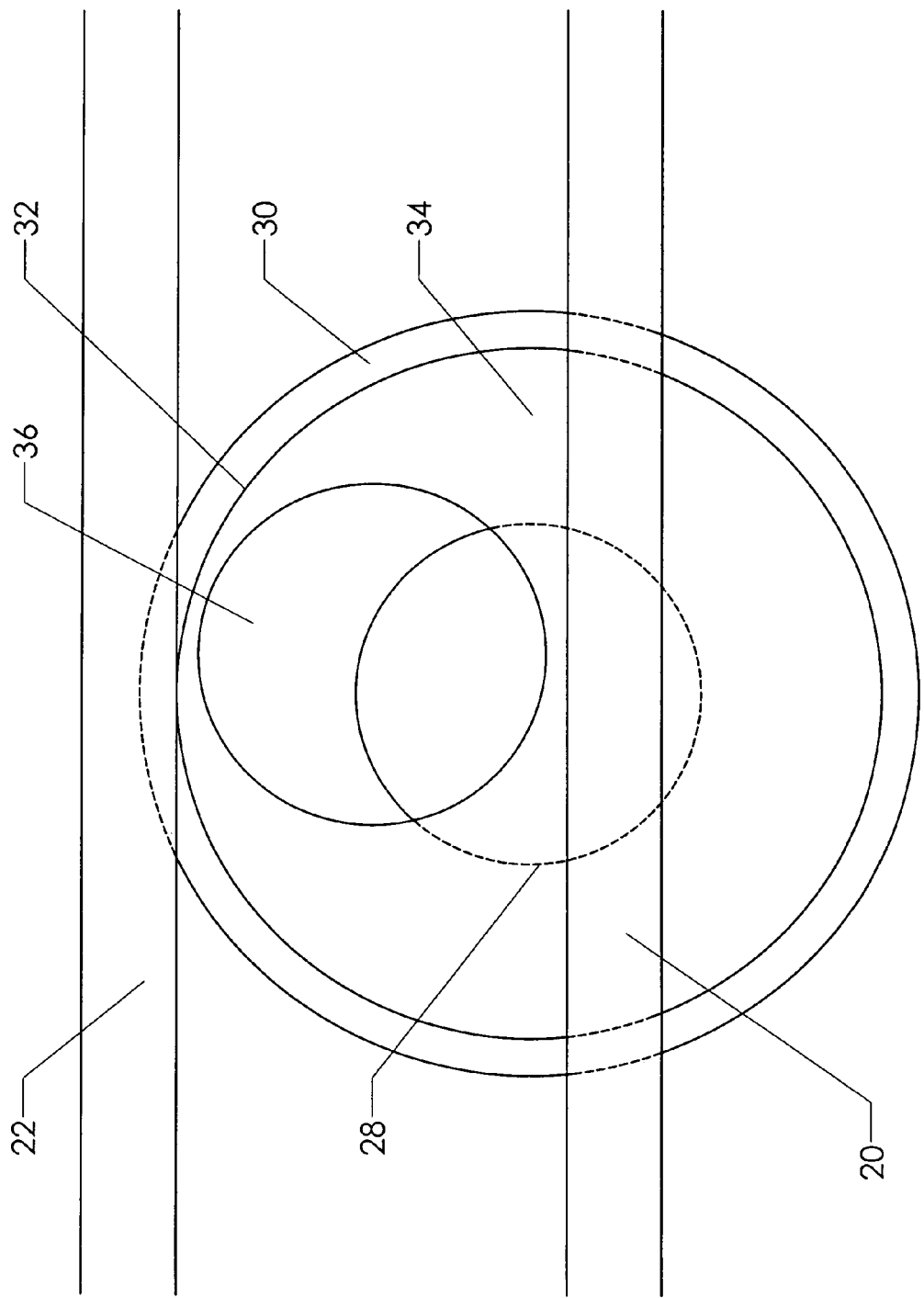
FIG. 9 is a plan view, showing how the invention may be used to align an in-wall pipe with a conduit.

An example of the advantages afforded by the adjustable coupling of the present invention is shown in FIG. 9. The reader will observe that conduit 28 has shifted such that its opening is partially blocked by second wall boundary 20. The plumber may discover this misalignment after the concrete has been poured and the builders have erected the exterior and interior wall frames of the building. Because the plumber placed increaser 30 at the end of conduit 28, the plumber can install the in-wall conduit without destroying a portion of the slab foundation. By rotating offset bushing 34 within opening 32 of increaser 30, first passage 36 may be positioned between second wall boundary 20 and first wall boundary 22 (as shown in FIG. 9). It should be noted that multiple nested bushings may be employed (such as in the previous closet flange example) if a broader range of placement tolerance is needed.

Figure 8:
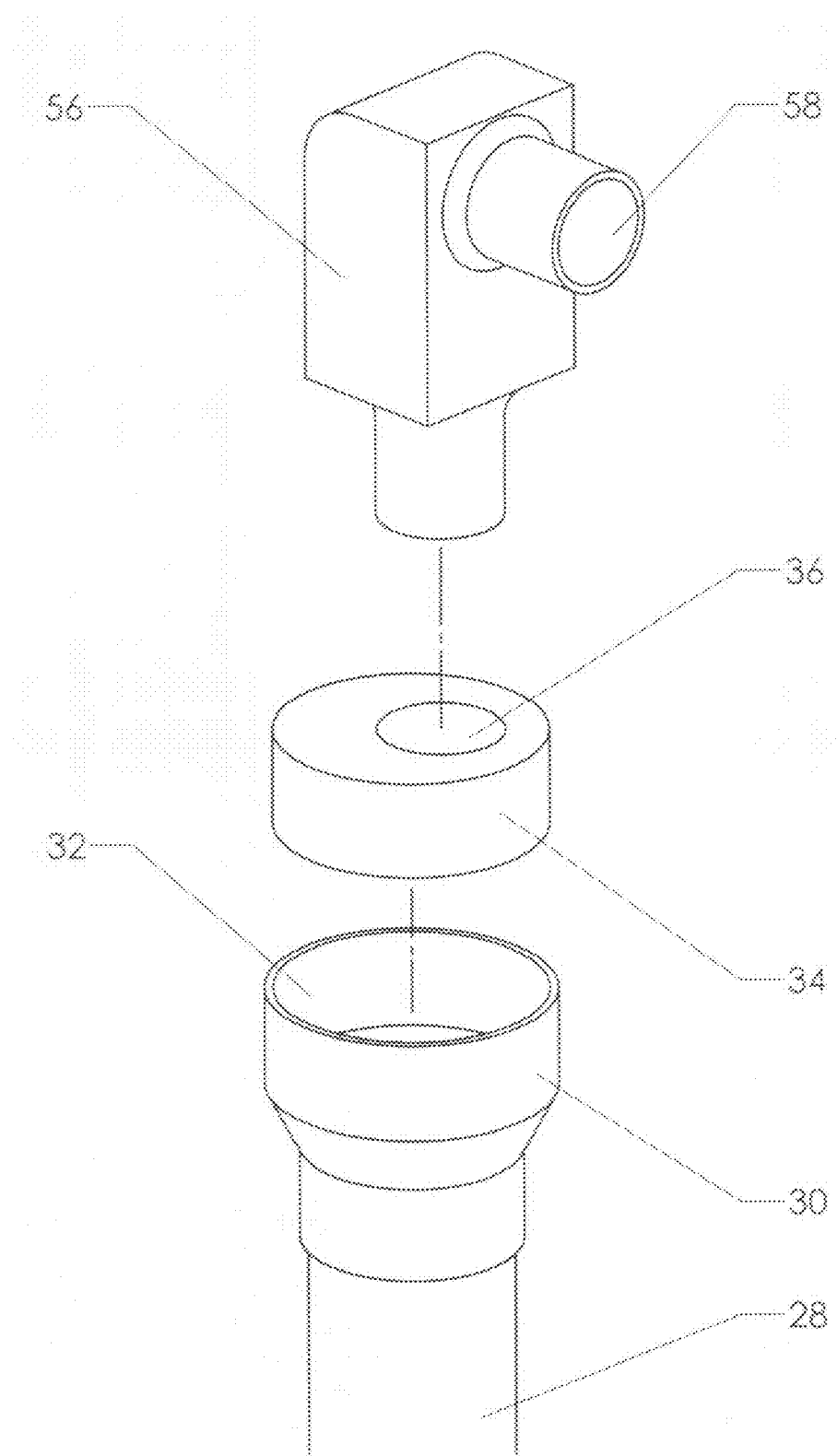
FIG. 8 is an exploded perspective view, showing the present invention.

FIG. 8 illustrates another example of an in-wall pipe embodiment. It has become increasingly common to tie dryer exhaust vents to in-concrete exhaust lines. These are typically located in walls and experience the same misalignment problems as in-wall plumbing conduits. In FIG. 8, dryer vent 56 is fluidly connected with conduit 28 to vent hot air exhausted from a clothes dryer. In order to reduce backpressure, it is desirable to increase the cross-sectional area of conduits in the exhaust stream. When running a cylindrical pipe through the wall the cross-sectional area is limited by the width of the space between the inside-facing surface and outside-facing surface of the wall (e.g., second wall boundary 20 and first wall boundary 22 of FIG. 9). Dryer vent 56 has a rectangular cross-section which allows the cross-sectional area to be larger than a standard cylindrical pipe. Dryer vent 56 has inlet 58 which extends through the wall and attaches to the exhaust of the dryer. The bottom of dryer vent 56 is fluidly connected to offset bushing 34. As with the previous examples, offset bushing 34 may be rotated within opening 32 of increaser 30 for the proper alignment of first passage 36.

When used for aligning in-wall conduits, the same installation procedure is used as described previously with respect to the closet flange. First, the plumber places pipes within the graded ground mold consistent with the building plans. Second, concrete is poured into the ground mold. Once the concrete cures, the builders erect the wall frames for the interior and exterior walls of the building. The plumber then removes the knockout covering plate from opening 32 of increaser 30. The offset bushings are then placed in opening 32 and rotated until second passage 40 is centered at the desired location. PVC cement is then applied to the cylindrical surfaces of the bushings and the exterior cylindrical surface of pipe 54 and the coupling is allowed to set.

It is generally important that the components of the assembled coupling be attached together to form an airtight seal. If PVC is used, the components may be attached to each other with a suitable plumbing adhesive. In the embodiment of FIG. 3, the outside cylindrical surface of offset bushing 34 would be attached to the inside cylindrical surface of opening 32. The outside cylindrical surface of offset bushing 38 would be attached to the inside cylindrical surface of first passage 36, and the outside cylindrical surface of descending tube 64 would be attached to the inside cylindrical surface of second passage 40.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

What is claimed is:

1. A coupling for attaching a plumbing component to a conduit, comprising:
   a. a receiver having a first end and a second end, said first end configured to fluidly connect to said conduit, said second end having a circular opening;
   b. a first bushing, said first bushing having a first end, a second end, and a circular exterior with a central axis, said circular exterior being configured to rotatably mount within said circular opening of said receiver;
   c. said first bushing including a passage extending from said first end to said second end, said passage being offset from said first bushing central axis;
   d. said passage including a lip proximate said first end of said first bushing, said lip creating a region of reduced diameter for said passage;
   e. a second bushing, said second bushing having a first end, a second end, and a circular exterior with a central axis, said circular exterior being configured to rotatably mount within said passage of said first bushing while being sized such that it is too large to drop past said lip;
   f. said second bushing including a passage extending from said first end to said second end, said passage of said second bushing being offset from said second bushing central axis;
   g. a closet flange, having a flange and a descending tube, said descending tube being configured to rotatably mount within said passage of said second bushing;
   h. said flange being configured to rest on top of said second bushing while extending over and covering said first and second bushings; and
   i. said closet flange including a passage passing vertically therethrough.

2. The coupling of claim 1, wherein said circular exterior of said first bushing and said circular opening in said receiver together comprise a close sliding fit suitable for joining by use of an adhesive.

3. The coupling of claim 2, wherein said circular exterior of said second bushing and said passage of said first bushing together comprise a close sliding fit suitable for joining by use of an adhesive.

4. The coupling of claim 1, wherein said receiver comprises an increaser, said second end of said receiver having a larger diameter than said first end.

* * * * *